2,819,210

CLAY BODIED GREASE COMPOSITIONS

Walter Linwood Haden, Jr., Barrington, and Cletus O. Martin, Pennsauken, N. J., assignors to Minerals & Chemicals Corporation of America, a corporation of Maryland No Drawing. Application September 29, 1953
Serial No. 383,132

3 Claims. (Cl. 252—28)

This invention relates to bodied lubricants, such as greases and the like; and more specifically to novel lubricants bodied with inorganic colloids, particularly clay.

A development of recent origin in the technology of bodied lubricants has to do with the utilization of certain naturally-occurring clays as the bodying agent in place of fatty acid soaps, and the like, heretofore customarily employed for that purpose. One method of preparation of this new type of grease requires the modification of a clay having a base exchange capacity of at least 25 in a manner to convert it from a hydrophilic clay into an organophilic clay capable of forming a gel upon dispersion in an organic liquid. The preferred process for modification of clay having the required minimum base exchange capacity involves reaction in water of the clay and an onium compound having surface-active properties whereby the exchangeable inorganic cation of the clay is exchanged for the cation of the onium compound to produce an organophilic onium-clay reaction product. This onium-clay reaction product then is dispersed in an organic liquid to form a gel therein.

Another recently developed method for producing lubricants bodied with clay involves the use of certain clays having absorbed on their surfaces cationic hydrophobic surface-active agents containing trivalent nitrogen atoms, such, for example, a hydrophobic aliphatic amine. In order to insure against any substantial reaction between the clay and the amine which would result in an onium-clay reaction product such as above described, the process requires the use of "clay-salts" wherein the majority of the ion-exchange sites are satisfied by the presence of metallic cations. These greases preferably are prepared by dispersing the clay in water to form a dilute hydrocol, adding the amine surface-active agent which is thus absorbed on the surface of the clay particles, milling the hydrogel with a lubricating oil, removing water to produce a slurry of the clay in the oil, and finally applying shear to the slurry until a grease structure is obtained.

These greases containing clay, either cationically modified or unaltered, as the bodying agent, possess certain advantages over the conventional lubricants bodied with soap, noteworthy of which is their ability to withstand relatively high temperatures without substantial loss of body. However, they are not entirely satisfactory for various reasons. One of the principal difficulties is in dispersing the clay, whether in the organophilic form or having an amine absorbed thereon, in the lubricating liquid. Moreover, frequently such large quantities of clay are necessary to provide a grease having sufficient body for any particular purpose that for economic reasons the grease cannot be produced commercially.

Accordingly an object of the present invention is to provide novel bodied lubricant compositions which will overcome the aforementioned difficulties.

Another object of the invention is to provide improved grease compositions containing naturally-occurring clay as the bodying agent and which possess such outstanding characteristics as no dropping point, excellent mechanical stability, and corrosion protection.

A further object is to provide such novel grease compositions, which also contain a combination of surface-active agents which bring about more complete dispersion of the clay in the lubricating liquid, indicated by improved penetration characteristics.

Other objects and features of the invention will be apparent from the description which follows.

We have discovered, in connection with the production of lubricants bodied with naturally-occurring clays, that important unexpected results are obtained by dispersing the clay in the lubricating liquid in the presence of two specific types of surface-active agents. Thus, we have found a remarkable enhancement in the penetration characteristics of such grease over a similar grease containing only a single one of such surface-active agents. Moreover, the novel grease compositions are characterized by excellent mechanical and temperature stability, good water absorption without loss of consistency, corrosion protection properties, and excellent bearing performance.

The novel greases of this invention comprised as their major ingredient an organic lubricating liquid, a gel forming amount of a naturally-occurring colloidal clay, and minor amounts of a pair of surface-active agents namely an alkylammonium salt of a monoalkyl alkylamido phosphate and a tertiary amine having as substituents, a single alkyl group and two polyoxyethylene groups. As above pointed out, we have discovered a synergistic effect insofar as grease penetration is concerned by the use of this particular combination of hydrophobic surface-active agents. Thus, our novel greases are characterized by penetrations far less than similar greases containing only a single one of such surface-active agents.

Any naturally-occurring clay may be used in the practice of this invention which has a surface area after drying to a temperature of 350 F. of 50 square meters per gram or more, and preferably 100 square meters per gram or more, as determined by a nitrogen adsorption method described by S. Brunauer, P. H. Emmett, and E. Teller in their article entitled "Adsorption of gases in multi-molecular layers," on page 309 of Journal of the American Chemical Society, vol. 60, February 1938, using the molecular size data of H. K. Livingston presented in his article entitled "Cross-sectional areas of molecules adsorbed on solid surfaces," on page 569, Journal of the American Chemical Society, vol. 66, April 1944. The clays particularly adaptable in the process of the invention are the sub-bentonites which are a class of non-swelling montmorillonite clay, nontronite, illite, hectorite, beidellite, saponite, halloysite, and fuller's earth particularly of the Georgia-Florida type. The surface areas of the enumerated clays are in excess of 50 square meters per gram. Georgia-Florida type fuller's earth, which is especially suitable in practice of the invention and produces excellent greases has a surface area between about 120 and 140 square meters per gram.

Raw clay, as mined, is suitable for use in the process or it may be dried or partially dried and, if desired, ground or crushed. The preferred process for preparation of the grease requires that the free moisture content of the clay be adjusted by the addition or elimination of water to a value of not less than 5%. By "free moisture content" of the clay, as used herein, is meant the weight of moisture removed from the clay upon drying a sample thereof to constant weight at a temperature of 220° F., expressed as the weight percent of such sample.

While suitable clay having a free moisture content of 5 to 50% or higher is useful in the preferred process of making the grease compositions of this invention, it is preferable to dry the clay to a free moisture content within the range from 5 to 30%.

The lubricating liquid, which comprises the major ingredient of our novel grease compositions, preferably is a mineral lubricating oil, particularly petroleum lubricating oil. It is to be understood, however, that it is within the scope of the subject invention to utilize any other suitable lubricating liquids such as one of the numerous synthetic lubricants. These synthetic lubricants are exemplified by silicon polymers, alkyl esters of organic acids, polymers of alkylene glycol, etc.

As above pointed out, the novel grease compositions, in addition to the colloidally dispersed clay and the lubricating liquid, includes minor amounts of two hydrophobic surface-active agents, namely, an alkylammonium salt of a mono-alkyl alkylamido phosphate, and a tertiary amine having a single alkyl group and two polyoxyethylene groups as substituents on the nitrogen atom.

The hydrophobic alkylammonium salt of a mono-alkyl alkylamido phosphate may be represented by the following structural formula:

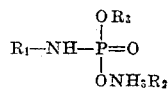

wherein $R_1$ and $R_2$ are relatively long chain alkyl groups of at least about 8 carbon atoms and preferably from about 8 to 20 carbon atoms, and $R_3$ is a short chain alkyl group containing, for example, from 1 to 6 carbon atoms.

We have found to be particularly useful in this invention such compounds sold by Victor Chemical Works under the trademarks Victamine C and Victamine D, in which, we understand, $R_1$ and $R_2$ are of equal length and contain 12 carbon atoms and 18 carbon atoms, respectively and $R_3$ is ethyl. A process for preparation of these compounds is disclosed in U. S. Patent No. 2,406,423.

The tertiary amines having a single alkyl group and two polyoxyethylene groups may be represented by the following formula:

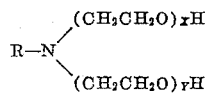

wherein R is an alkyl group having at least about 8 carbon atoms and preferably between 12 and 20, and X and Y are integers totaling between 2 and 50.

We have found to be particularly suitable such tertiary amines sold by Armour Chemical Division of Armour and Company under the trademarks Ethomeen 18/12 in which, we understand, R contains 18 carbon atoms and X and Y total 2; Ethomeen 18/15 in which, we understand, R contains 18 carbon atoms and X and Y total 5, X and Y predominantly being 2 and 3 respectively; Ethomeen 18/20 in which, we understand, R contains 18 carbon atoms and X and Y total 10; Ethomeen 18/25 in which, we understand, R contains 18 carbon atoms and X and Y total 15; and Ethomeen 18/60 in which, we understand, R contains also 18 carbon atoms and X and Y total 50.

The quantity of clay in our novel greases may vary over a relatively wide range and the optimum amount in any particular case is dependent upon several factors including the type of lubricating liquid which is to be bodied and also the penetration desired in the final grease product. Thus, if a low consistency grease is desired only about 3 or 4% by weight of clay on a volatile-free (heated to constant weight at 1800° F.) basis will be required in the grease, whereas if a grease having relatively low penetration is to be produced, a larger amount of clay will be required, such as 7% or more. For most purposes the clay will range from about 3% to 15% by weight of the grease.

The combined amount of the two surface-active agents required for the preparation of the novel grease compositions of this invention likewise may vary over a relatively wide range dependent, inter alia, upon the type of lubricating liquid and clay. In practice, however, it has been found that from about 1% to about 8% by weight of surface-active agents, based on the total weight of the grease constituents, is sufficient. Likewise, there is considerable latitude in the relative proportions of the two surface-active agents. Satisfactory results have been obtained, however, with a ratio of alkylammonium salt of a mono-alkyl alkylamido phosphate to tertiary amine of from about 1 to 10 to about 4 to 1, dependent upon the total amount of the surface-active agents used, and preferably from about 1 to 4 to 1.5 to 1.

The novel grease compositions of this invention may be conveniently prepared by the process for bodying organic liquids, disclosed and claimed in co-pending application, Serial No. 245,774, filed September 8, 1951, in the name of Haden et al. In accordance with that process, raw clay is first dispersed in water and allowed to stand to permit coarse particles to settle out; after which clay particles larger than a selected maximum size may be eliminated by centrifuging or other suitable classifying means. The purified slurry is then dried to yield clay particles substantially not larger than the desired maximum particle size and having a free moisture content of from about 5% to about 30%.

This clay, together with proper amounts of the two dispersing agents and the lubricating liquid, is subjected to shear or agitation in suitable equipment such, for example, as a high speed mixer, colloid mill, homogenizing mill or a similar device. While continuously agitating or otherwise applying shear to the mixture, heat is also applied to raise the temperature sufficiently to cause a portion or all of the free moisture in the clay to vaporize. As the free moisture first begins to vaporize, it will be noted that simultaneously therewith the oil will thicken considerably. Additional vaporization of the free moisture results in further gelling of the oil, especially when the free moisture content of the clay is high, that is, 30% to 50% or more. Agitation is continued until the desired final grease product has been obtained. Such grease consists of a stable dispersion of clay in the organic liquid and substantially does not lose body even at temperatures as high as 500° F. or higher.

If desired, the lubricating liquid may be preheated to reduce the heat necessary to be supplied to the mixture of the clay ingredients to raise the mixture to a temperature sufficient to vaporize the free moisture of the clay. It is essential, however, that the mixture be subjected to shearing force such as agitation while being heated sufficiently to vaporize a portion or all of the free moisture of the clay. It is preferable to heat the mixture to a temperature of from about 220° F. to about 300° F., although lower or higher temperatures may be utilized, especially in cases where the vessel containing the mixture is subjected to a partial vacuum or is pressurized.

The order in which the clay, lubricating liquid and the surface-active agents are mixed is of no particular consequence. Thus the dispersing agents may first be mixed with the lubricating liquid and then the clay added to such mixture, or it may be desired to mix the clay and lubricating liquid and then add the dispersing agents thereto. Again all the materials may be mixed simultaneously.

The invention will be further illustrated by the following examples which show the synergistic effect obtained by the use of the two surface-active agents above described. It is to be understood, however, that these examples are given primarily for illustrative purposes and the invention in its broadest aspect is not limited thereto.

The grit-free colloidal fuller's earth, used in the examples below, was prepared in the following manner: 1,000 g. of raw Georgia-Florida fuller's earth having a volatile matter content of from 50% to 60% was dispersed in 2440 g. of water, and the slurry was allowed to stand for one hour for the purpose of settling out nonclay impurities, such as sand. Then the slurry was centrifuged under a force equal to 13,000 times the force of gravity to remove undispersed clay agglomerates and fine particle sized quartz and other abrasive foreign materials. The resulting grit-free slurry was composed of colloidal attapulgite crystals with a particle size predominantly less than 250 millimicrons in equivalent spherical diameter. The slurry was then dried under mild drying conditions (220° F.) to provide a grit-free colloidal fuller's earth having a free moisture content of approximately 25%.

EXAMPLE I 135 cc. of solvent refined Mid-Continent type petroleum oil, having a viscosity of approximately 1100 S. S. U. at 100° F. was placed in a vessel (Waring Blendor) provided with a motor driven mechanical agitator. To the oil, 10 grams of the colloidal clay on a volatile free basis was added. Then a total of 3 grams of Victamine C or Ethomeen 18/15 or various mixtures thereof, as indicated in the table below, was added. This mixture was agitated at such a rate as to generate sufficient heat to vaporize the free moisture of the clay. At the instant vapor bubbles began to appear in the mixture, considerable thickening of the oil was observed. Agitation was continued for several more minutes until gelling occurred. The grease, after being cooled to a temperature of 77° F., was tested and found to have the penetration values given in Table I.

*Table I*

| Victamine C (grams) | Ethomeen 18/15 (grams) | Penetrations | |
|---|---|---|---|
| | | Unworked | Spatula-Worked |
| 3.0 | 0 | 356 | 410 |
| 2.0 | 1.0 | 269 | 351 |
| 1.5 | 1.5 | 302 | 362 |
| 1.0 | 2.0 | 312 | 357 |
| 0.5 | 2.5 | 375 | 392 |
| 0 | 3.0 | 415 | 415 |

From an examination of the data given in Table I, it will be seen that grease compositions produced using Victamine C alone and Ethomeen 18/15 alone had spatula-worked penetration values of 410 and 415 respectively. The synergistic effect resulting from the use of a combination of these two surface-active agents is demonstrated in the fact that the grease compositions containing the two surface-active agents in various proportions possessed penetration values ranging from 392 down to a minimum of 357 in the case of a Victamine C to Ethomeen 18/15 ratio of 1 to 2. These data clearly establish and show the unexpected improvement in penetration of greases produced in accordance with this invention using the specified combination of surface-active agents.

EXAMPLE II

The procedure of Example I was repeated except that a total of 4 grams of either Victamine C or Ethomeen 18/15 or mixtures of them, as set forth in Table II, were used in the production of the grease compositions. The results of this example are set forth in Table II.

*Table II*

| Victamine C (grams) | Ethomeen 18/15 (grams) | Penetrations | |
|---|---|---|---|
| | | Unworked | Spatula-Worked |
| 4.0 | 0 | 362 | 377 |
| 3.0 | 1.0 | 363 | 387 |
| 2.5 | 1.5 | 318 | 378 |
| 2.0 | 2.0 | 262 | 340 |
| 1.5 | 2.5 | 260 | 335 |
| 1.0 | 3.0 | 280 | 348 |
| 0 | 4.0 | 379 | 390 |

EXAMPLE III

Again the procedure of Example I was repeated except that in this case a total of 5 grams of Victamine C or Ethomeen 18/15 or a mixture of them was used in making the various grease compositions, as indicated in Table III below. The results of this example are presented in Table III.

*Table III*

| Victamine C (grams) | Ethomeen 18/15 (grams) | Penetrations | |
|---|---|---|---|
| | | Unworked | Spatula-Worked |
| 5.0 | 0 | 385 | 397 |
| 4.0 | 1.0 | 398 | 400 |
| 3.0 | 2.0 | 412 | 411 |
| 2.5 | 2.5 | 382 | 398 |
| 2.0 | 3.0 | 337 | 383 |
| 1.0 | 4.0 | 271 | 352 |
| 0 | 5.0 | 347 | 389 |

The data in Tables II and III are similar to the data in Table I in that they show the synergistic effect which occurs as a result of the use of a mixture of the two surface-active agents. These data, when compared with the data in Table I, also show that for optimum penetration the ratio of the two surface-active agents varies, dependent upon the total weight of the surface-active agents in the grease. Thus optimum worked greases penetration was obtained in the case of grease containing a total of three grams of surface-active agents (Table I) when the ratio of Victamine C to Ethomeen 18/15 was 1 to 2; in the case of grease containing 4 grams of surface-active agents (Table II), when the ratio was 1 to about 1.7; and in the case of grease containing 5 grams of surface-active agents, when such ratio was 1 to 4.

We claim:

1. A bodied lubricant consisting essentially of a petroleum hydrocarbon oil having colloidally dispersed therein Georgia-Florida fuller's earth in an amount on a volatile-free basis of from about 3 to 15 percent based on the total weight of the lubricant, a hydrophobic surface-active agent having the following structural formula:

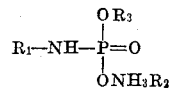

wherein $R_1$ and $R_2$ are alkyl groups having at least 8 carbon atoms and $R_3$ is an alkyl group containing from 1 to 6 carbon atoms, and a hydrophobic surface-active agent having the following structural formula:

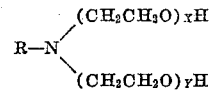

wherein R is an alkyl group having at least about 8 carbon atoms and X and Y are integers totalling from 2 to 50, said surface-active agents being present in a combined amount of from about 30 to 50 percent and the first mentioned surface-active agent being present in an amount of from 5 to 25 percent, both based on the volatile-free weight of said fuller's earth, the quantities of said surface-active agents being such as to effect substantial synergistic improvement in the penetration characteristics of the bodied lubricant over the penetration characteristics of a bodied lubricant similar thereto except containing only one of said surface-active agents.

2. The bodied lubricant of claim 1 wherein said surface-active agents respectively comprise:

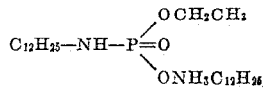

and

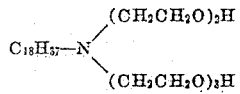

3. The bodied lubricant of claim 1 wherein said surface-active agents respectively comprise:

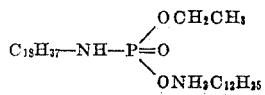

and

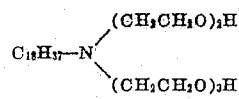

References Cited in the file of this patent

UNITED STATES PATENTS

| | | |
|---|---|---|
| 2,623,853 | Stross | Dec. 30, 1952 |
| 2,626,899 | Abrams et al. | Jan. 27, 1953 |
| 2,629,691 | Peterson | Feb. 24, 1953 |
| 2,647,872 | Peterson | Aug. 4, 1953 |
| 2,681,314 | Skinner et al. | June 15, 1954 |

OTHER REFERENCES

Schwartz et al.: "Surface Active Agents" (pp. 199–200), 1949.

McCutcheon: "Soap and Sanitary Chemicals" (p. 44), September 1949, vol 25.

Boner: "Lubricating Greases," Reinhold Pub. Co., 1954 (pages 750–51).

Bulletin: "Colloidal Attapulgite in Greases," Attapulgus Clay Co., October 20, 1952 (cited in Boner), page 750.